(12) United States Patent
Inoue et al.

(10) Patent No.: US 11,806,730 B2
(45) Date of Patent: Nov. 7, 2023

(54) CENTRIFUGAL SEPARATION-TYPE OIL SEPARATOR

(71) Applicant: DAIKIN INDUSTRIES, LTD., Osaka (JP)

(72) Inventors: Takashi Inoue, Osaka (JP); Yoshiyuki Uemura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/955,283

(22) Filed: Sep. 28, 2022

(65) Prior Publication Data

US 2023/0018165 A1    Jan. 19, 2023

Related U.S. Application Data

(63) Continuation of application No. PCT/JP2021/005842, filed on Feb. 17, 2021.

(30) Foreign Application Priority Data

Mar. 31, 2020    (JP) ................................. 2020-063010

(51) Int. Cl.
*B01D 45/16*    (2006.01)
*B04C 5/04*    (2006.01)
(Continued)

(52) U.S. Cl.
CPC ............... *B04C 5/04* (2013.01); *B01D 45/16* (2013.01); *B04C 5/103* (2013.01); *F25B 31/004* (2013.01); *F25B 2400/23* (2013.01)

(58) Field of Classification Search
CPC ........... B04C 5/04; B04C 5/103; B01D 45/16; F25B 31/004; F25B 2400/23
See application file for complete search history.

(56) References Cited

U.S. PATENT DOCUMENTS 1,344,146 A * 6/1920 Peck ......................... B04C 1/00
  209/722
2,786,547 A * 3/1957 Mccartney ................ B04C 5/04
  55/459.5
(Continued)

FOREIGN PATENT DOCUMENTS

CN    108988524 A    12/2018
EP    2 899 403 A1    7/2015
(Continued)

OTHER PUBLICATIONS

European Search Report of corresponding EP Application No. 21 77 9347.0 dated Nov. 9, 2022.
(Continued)

*Primary Examiner* — Dung H Bui
(74) *Attorney, Agent, or Firm* — Global IP Counselors, LLP

(57) ABSTRACT

A centrifugal separation type oil separator includes an oil separator body having a cylindrical body portion, and a bent pipe provided on an outer peripheral side of the body portion to surround the body portion in a circumferential direction, to introduce a fluid containing an oil into the oil separator body. The bent pipe includes an outer wall portion extending in the circumferential direction of the body portion and expanding radially outward from the body portion, and an inner wall portion extending along the outer wall portion and blocking an open part of the outer wall portion. The outer wall portion and the inner wall portion are formed by different members. An upper side of the body portion is open. The oil separator body has an upper cover blocking an open portion of the body portion. The inner wall portion and the upper cover are formed by an integral member.

7 Claims, 12 Drawing Sheets

(51) Int. Cl.
*B04C 5/103* (2006.01)
*F25B 31/00* (2006.01)

(56) References Cited

U.S. PATENT DOCUMENTS

| | | | | |
|---|---|---|---|---|
| 3,953,184 A * | 4/1976 | Stockford | ............ | B01D 45/12 |
| | | | | 55/459.3 |
| 4,948,396 A * | 8/1990 | Barnes | ................ | B01D 50/20 |
| | | | | 55/315 |
| 8,025,713 B2 * | 9/2011 | Dou | ..................... | B04C 11/00 |
| | | | | 55/459.3 |
| D731,135 S * | 6/2015 | Small | ............................ | D32/31 |
| 2002/0074509 A1* | 6/2002 | Quill | ........................ | B04C 5/12 |
| | | | | 250/432 R |
| 2009/0246060 A1 | 10/2009 | Inoue et al. | | |
| 2019/0060917 A1* | 2/2019 | Chang | ............... | B23Q 11/1069 |
| 2020/0230535 A1* | 7/2020 | Inoue | ...................... | B04C 5/04 |

FOREIGN PATENT DOCUMENTS

| | | |
|---|---|---|
| JP | 2003-13858 A | 1/2003 |
| JP | 2007-321688 A | 12/2007 |
| JP | 2014-118872 A | 6/2014 |
| JP | 2015-175281 A | 10/2015 |
| JP | 6369066 B2 | 7/2018 |
| JP | 6597744 B2 | 10/2019 |
| KR | 10-2013-0032682 A | 4/2013 |
| WO | WO-2019064882 A1 * 4/2019 ............. B01D 45/12 |

OTHER PUBLICATIONS

International Search Report of corresponding PCT Application No. PCT/JP2021/005842 dated Apr. 13, 2021.
International Preliminary Report of corresponding PCT Application No. PCT/JP2021/005842 dated Oct. 13, 2022.

* cited by examiner

US 11,806,730 B2

CENTRIFUGAL SEPARATION-TYPE OIL SEPARATOR

CROSS-REFERENCE TO RELATED APPLICATIONS

This is a continuation of International Application No. PCT/JP2021/005842 filed on Feb. 17, 2021, which claims priority to Japanese Patent Application No. 2020-063010, filed on Mar. 31, 2020. The entire disclosures of these applications are incorporated by reference herein.

BACKGROUND

Technical Field

The present invention relates to a centrifugal separation-type oil separator.

Background Art

Japanese Patent No. 6597744 discloses a centrifugal separation-type oil separator to be attached to a compressor. The oil separator is provided with a bent pipe for sending a fluid discharged from the compressor to an oil separator body. The bent pipe has an outer wall portion and an inner wall portion that are constituted by the same member. The inner wall portion is shared by the bent pipe and the oil separator body (refer to FIG. 4 of Japanese Patent No. 6597744).

SUMMARY

A first aspect is a centrifugal separation-type oil separator that includes an oil separator body having a cylindrical body portion, and a bent pipe provided on an outer peripheral side of the body portion to surround the body portion in a circumferential direction, the bent pipe being configured to introduce a fluid containing an oil into an inside of the oil separator body. The bent pipe includes an outer wall portion extending in the circumferential direction of the body portion and expanding radially outward from the body portion, and an inner wall portion extending along the outer wall portion and blocking a radially inner-side open part of the outer wall portion. The outer wall portion and the inner wall portion are formed by different members. An upper side of the body portion is open. The oil separator body has an upper cover blocking an upper-side open portion of the body portion. The inner wall portion and the upper cover are formed by an integral member. The upper cover and the body portion are formed by different members, and an outer peripheral portion of the upper cover is disposed on an upper side of a peripheral portion of the body portion to block the open portion.

BRIEF DESCRIPTION OF THE DRAWINGS

FIG. 2 illustrates a state in which a cover is viewed from the front side.

DETAILED DESCRIPTION OF EMBODIMENT(S)

Hereinafter, embodiments of the present invention will be described with reference to the drawings. The following embodiments are basically presented as preferred examples and do not intend to limit the present invention, applications thereof, or the range of use thereof. Configurations in the embodiments, modifications, the other examples, and the like described below can be combined together or partially replaced within a range in which the present invention is executable.

Embodiment

A compressor unit (U) according to an embodiment has a compressor (10) and an oil separator (30). The oil separator (30) is attached to the compressor (10). The compressor unit (U) is to be connected to a refrigerant circuit of a refrigeration apparatus. The refrigerant circuit is charged with a refrigerant. The refrigerant corresponds to the fluid in the present disclosure. The refrigerant circuit is configured to perform a vapor compression refrigeration cycle. Specifically, the refrigerant compressed in the compressor dissipates heat in a radiator. The refrigerant that has dissipated heat is decompressed in a decompression portion. The refrigerant decompressed in the decompression portion evaporates in an evaporator. The refrigerant that has evaporated in the evaporator is sucked by the compressor. The refrigerant contains a lubricating oil (hereafter, referred to as the oil) for lubricating sliding portions of the compressor (10).

Compressor

Figure 1:
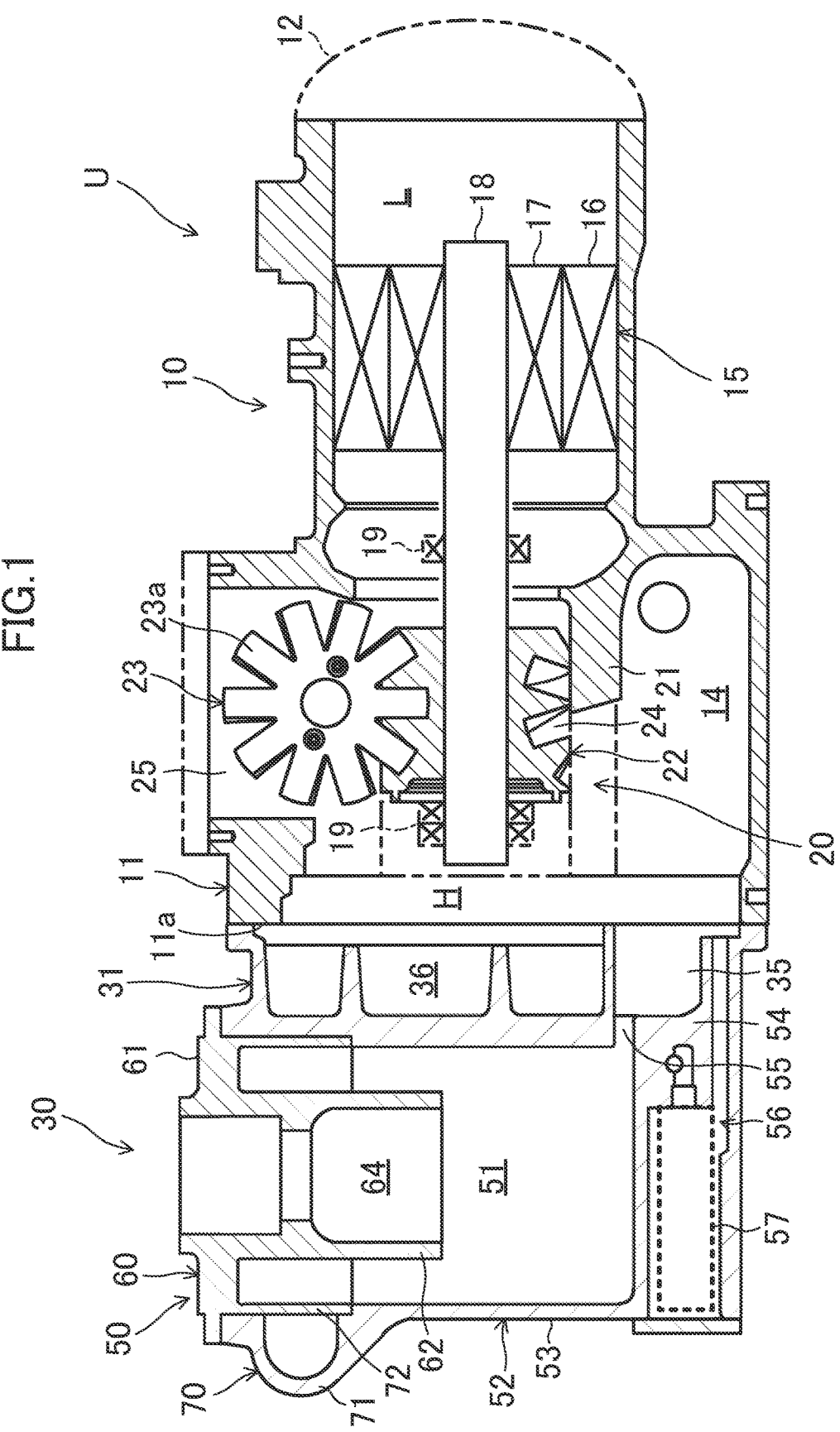
FIG. 1 is a longitudinal sectional view illustrating a schematic configuration of a compressor unit according to an embodiment.

The compressor (10) compresses a refrigerant. The compressor (10) sucks a gas refrigerant having a low pressure and compresses the gas refrigerant. The compressor (10) discharges the gas refrigerant having a high pressure after compression. As illustrated in FIG. 1, the compressor (10) is a screw compressor. The compressor (10) is of a single screw type having one screw rotor (22). The compressor (10) is of a one gate type having one gate rotor (23). The compressor (10) includes a casing (11), an electric motor (15), a drive shaft (18), and a compression mechanism (20).

Casing

The casing (11) has a laterally elongated cylindrical shape. A low-pressure chamber (L) and a high-pressure chamber (H) are formed in the inside of the casing (11). The low-pressure chamber (L) constitutes a flow path in which the low-pressure gas refrigerant that is to be sucked by the compression mechanism (20) flows. The high-pressure chamber (H) constitutes a flow path in which the high-pressure gas refrigerant discharged from the compression mechanism (20) flows.

A suction cover (12) is attached to one end of the casing (11) in the longitudinal direction. An opening portion (11a) is formed at the other end of the casing (11) in the longitudinal direction. The opening portion (11a) is provided on the high-pressure side of the casing (11) where the high-pressure chamber (H) is formed. A cover (31) of the oil separator (30) is attached to the opening portion (11a). An oil chamber (14) in which the oil is stored is formed at a bottom portion in the casing (11).

Electric Motor

The electric motor (15) is housed in the casing (11). The electric motor (15) has a stator (16) and a rotor (17). The stator (16) is fixed to the inner wall of the casing (11). The rotor (17) is disposed in the inside of the stator (16). The drive shaft (18) is fixed in the inside of the rotor (17).

Drive Shaft

The drive shaft (18) couples the electric motor (15) and the compression mechanism (20) to each other. The drive shaft (18) extends in the longitudinal direction of the casing (11). The drive shaft (18) extends in a substantially horizontal direction. The drive shaft (18) is rotatably supported by a plurality of bearings (19). The bearings (19) are fixed to the casing (11) via a bearing folder (not illustrated).

Compression Mechanism

The compression mechanism (20) has one cylinder portion (21), one screw rotor (22), and one gate rotor (23).

The cylinder portion (21) is formed in the inside of the casing (11). The screw rotor (22) is disposed on the inner side of the cylinder portion (21). The screw rotor (22) is fixed to the drive shaft (18). A plurality (three in the present example) of spiral screw grooves (24) are formed at the outer peripheral surface of the screw rotor (22). The outer peripheral surface of the tooth tip of the screw rotor (22) is surrounded by the cylinder portion (21). One end side of the screw rotor (22) in the axial direction faces the low-pressure chamber (L). The other end side of the screw rotor (22) in the axial direction faces the high-pressure chamber (H).

The gate rotor (23) is housed in a gate rotor chamber (25). The gate rotor (23) has a plurality of radially arranged gates (23a). The gates (23a) of the gate rotor (23) pass through a portion of the cylinder portion (21) and mesh with the screw grooves (24). A suction port and a compression chamber are formed in the compression mechanism (20). The suction port is a part of the screw grooves (24) opening in the low-pressure chamber (L). The compression chamber is formed among the inner peripheral surface of the cylinder portion (21), the screw grooves (24), and the gates (23a). In the compression mechanism (20), the refrigerant compressed in the compression chamber is discharged to the high-pressure chamber (H) through a discharge port.

The compression mechanism (20) has a slide valve mechanism (not illustrated). The slide valve mechanism adjusts a timing at which the compression chamber and the discharge port are caused to be in communication with each other. The slide valve mechanism includes a slide member (slide valve) that moves forward and rearward in the axial direction of the drive shaft (18). A portion of the slide member is positioned in the high-pressure chamber (H).

Oil Separator

Figure 2:
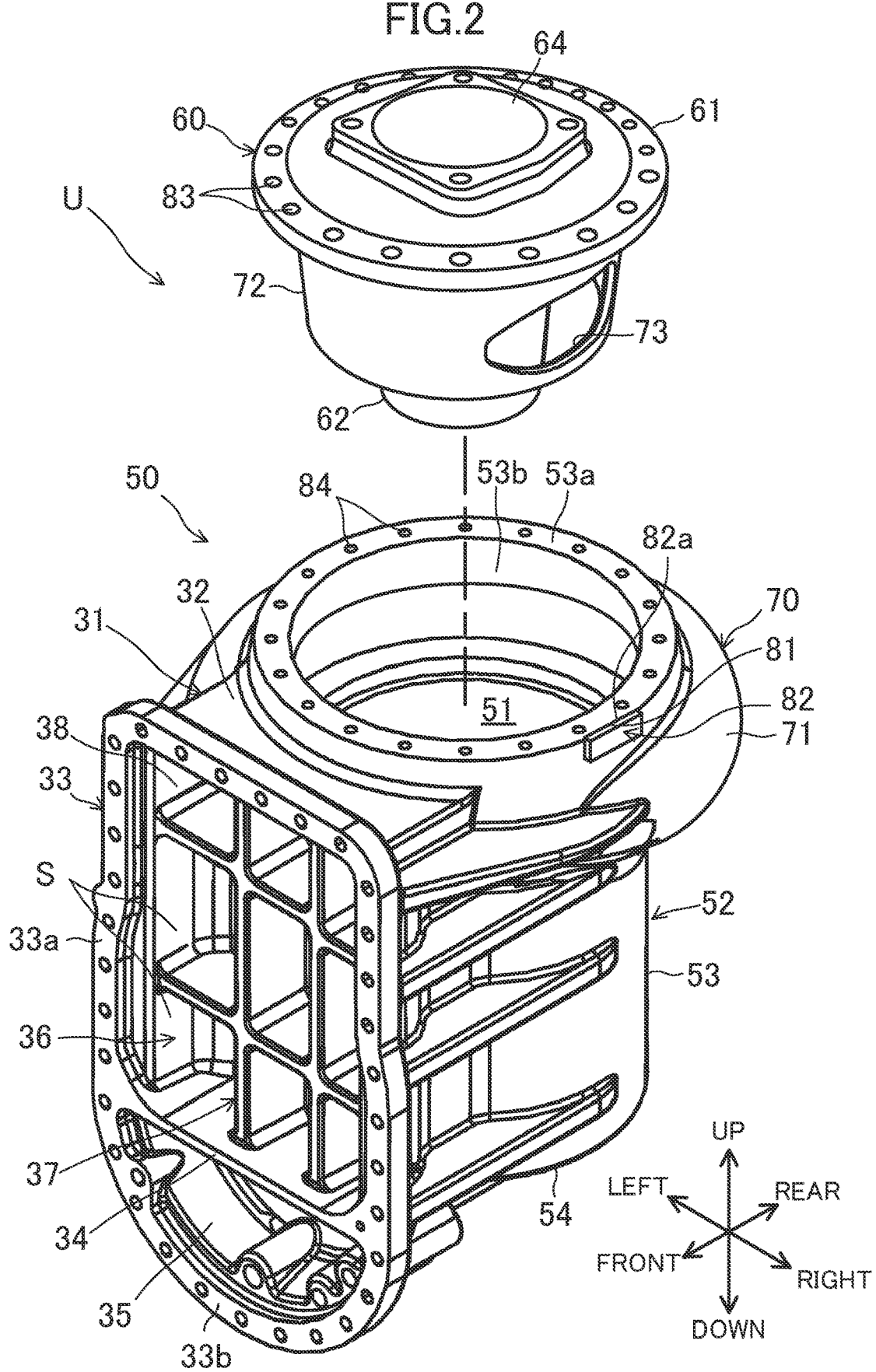
FIG. 2 is an exploded perspective view of an oil separator.

The oil separator (30) will be described. In the following description, terms relating to "up", "down", "right", "left", "front", and "rear" are basically based on a case in which the cover (31) illustrated in FIG. 2 is viewed from the front.

The oil separator (30) is of a centrifugal separation type that separates an oil from a refrigerant by a centrifugal force. The oil separator (30) separates the oil from the refrigerant discharged from the compression mechanism (20). The oil separator (30) includes the cover (31), a cylindrical oil separator body (50), and a bent pipe (70).

Cover

The cover (31) will be described with reference to FIG. 1 to FIG. 6.

The cover (31) is attached to the opening portion (11a) on the discharge side of the compressor (10). The cover (31) blocks the high-pressure chamber (H) of the compressor (10). The vertical height of the cover (31) is larger than the width thereof in the left-right direction. The cover (31) has a cover body (32) and a flange portion (33). The cover body (32) has a hollow shape that opens on the front side. The flange portion (33) is provided at the front end of the cover body (32). The flange portion (33) has a vertically elongated frame shape. The flange portion (33) is fixed to the opening portion (11a) of the casing (11) via a fastening member.

The flange portion (33) includes a first flange portion (33a) and a second flange portion (33b). The first flange portion (33a) is formed to extend from an upper portion to an intermediate portion of the flange portion (33). The second flange portion (33b) is formed at a lower portion of the flange portion (33). The first flange portion (33a) has an inverted shape in front view. Strictly, the first flange portion (33a) has a shape in which a lower side of a vertically elongated rectangular portion is cut out in front view. The second flange portion (33b) has a U-shape in front view. Strictly, the second flange portion (33b) has an arc shape in front view.

The cover (31) has a partition wall (34). The partition wall (34) is provided at a lower portion of the flange portion (33). The partition wall (34) is positioned at the boundary part between the first flange portion (33a) and the second flange portion (33b). The partition wall (34) extends in the horizontal direction so as to extend between left and right both ends of the flange portion (33). The partition wall (34) partitions the inside of the cover (31) into an oil reservoir space (35) and a discharge space (36).

The oil reservoir space (35) is positioned below the partition wall (34). The oil reservoir space (35) is positioned on the inner side of the second flange portion (33b). As illustrated in FIG. 1, the oil reservoir space (35) is at a height position corresponding to the oil chamber (14) in the casing (11). In the oil reservoir space (35), the oil that has been separated in the oil separator (30) accumulates.

The discharge space (6) is positioned above the partition wall (34). The discharge space (36) is positioned on the inner side of the first flange portion (33a). The discharge space (36) is at a height position corresponding to the high-pressure chamber (H) in the casing (11). The high-pressure gas refrigerant discharged by the compression mechanism (20) flows into the discharge space (36).

Figure 3:
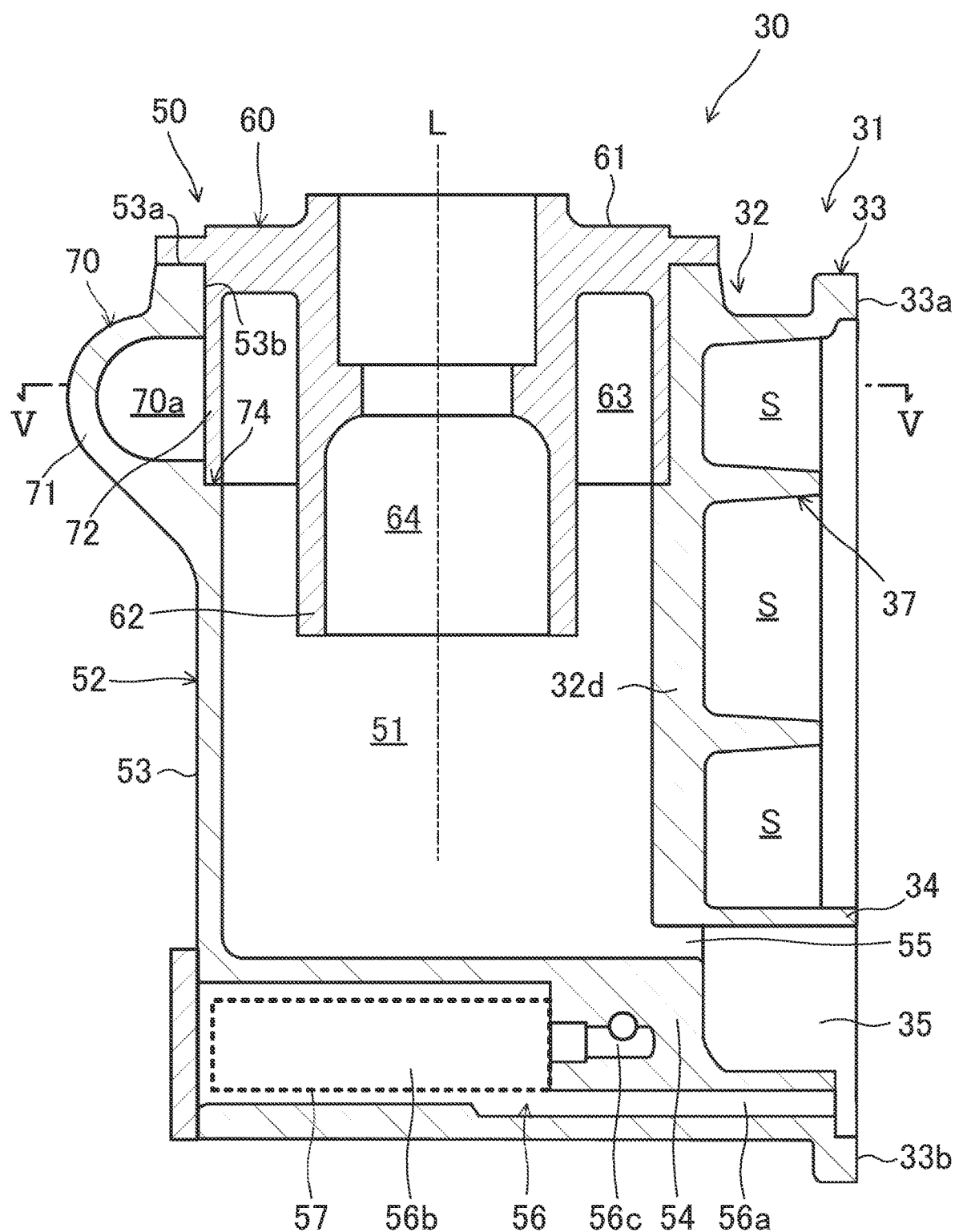
FIG. 3 is a sectional view taken along line III-III in FIG. 4.

As illustrated in FIG. 2 and FIG. 3, the discharge space (36) is partitioned into a plurality of spaces by a dividing wall portion (37). A total of nine spaces in three rows and three columns are formed in the cover (31) in the present embodiment. Among these spaces, the space on the uppermost side and on the leftmost side constitutes a discharge flow path (38). The discharge flow path (38) is in communication with the bent pipe (70). The remaining eight spaces correspond to divided spaces (S).

Outline of Oil Separator Body

The oil separator body (50) will be described with reference to FIG. 2 to FIG. 6.

The oil separator body (50) has a cylindrical shape. Strictly, the oil separator body (50) has a hollow cylindrical shape. A separation space (51) for separating the oil from the refrigerant by a centrifugal force is formed in the inside of the oil separator body (50). The refrigerant that has flowed through the bent pipe (70) flows into the separation space (51). The oil separator body (50) has an outer cylinder (52) and a cover member (60).

Outer Cylinder

As illustrated in FIG. 2 and FIG. 3, the outer cylinder (52) has a bottomed cylindrical shape in which the upper side is open. The outer cylinder (52) includes a cylindrical body portion (53) and a bottom portion (54) formed on the lower side of the body portion (53). Strictly, the outer cylinder (52) has an outer wall portion (71) of the bent pipe (70).

An annular peripheral portion (53a) is formed at the upper end of the body portion (53). An open portion (53b) that opens upward is formed on the inner side of the peripheral portion (53a). A plurality of body-portion-side fastening holes (84) are formed in the peripheral portion (53a). The plurality of body-portion-side fastening holes (84) pass through the peripheral portion (53a) in the axial direction of the body portion (53). The plurality of body-portion-side fastening holes (84) are arranged at equal intervals in the circumferential direction of the body portion (53).

The front part of the body portion (53) is integral with the cover (31). The body portion (53) has an oil outflow hole (55). The oil outflow hole (55) is formed at the lower end of the front part of the body portion (53). The oil outflow hole (55) is at a height position identical to the height position of the bottom surface of the outer cylinder (52). The oil outflow hole (55) causes the separation space (51) and the oil reservoir space (35) to be in communication with each other. The oil in the separation space (51) flows out to the oil reservoir space (35) through the oil outflow hole (55).

An oil-returning flow path (56) is formed at the bottom portion (54). The oil-returning flow path (56) is a flow path for supplying the oil in the oil reservoir space (35) to a predetermined lubrication portion and the like of the compressor (10). The oil-returning flow path (56) includes a first flow path (56a), a second flow path (56b), and a third flow path (56c). In the oil-returning flow path (56), the first flow path (56a), the second flow path (56b), and the third flow path (56c) are connected in this order from the upstream side toward the downstream side.

The inflow end of the first flow path (56a) opens in the oil reservoir space (35). The outflow end of the first flow path (56a) opens in the second flow path (56b). The outer diameter of the second flow path (56b) is larger than the outer diameters of the first flow path (56a) and the third flow path (56c). The second flow path (56b) is provided with a catching member (57) that catches impurities in the oil. The catching member (57) is constituted by, for example, a bottomed cylindrical mesh member. The front open end of the catching member (57) surrounds the inflow port of the third flow path (56c). The oil from which impurities are caught by the catching member (57) is supplied to a predetermined sliding portion via the third flow path (56c).

Cover Member

As illustrated in FIG. 2 to FIG. 6, the cover member (60) is provided at an upper portion of the outer cylinder (52). The cover member (60) has an upper cover (61) and an inner cylinder (62). The cover member (60) further has an inner wall portion (72) of the bent pipe (70). The inner wall portion (72) constitutes a portion of the bent pipe (70).

The upper cover (61) blocks the open portion (53b) on the upper side of the body portion (53). The upper cover (61) has a substantially disc shape. A plurality of cover-side fastening holes (83) are formed in the outer peripheral portion of the upper cover (61). The plurality of cover-side fastening holes (83) pass through the outer peripheral portion of the upper cover (61) in the axial direction of the upper cover (61). The plurality of cover-side fastening holes (83) are arranged at equal intervals in the circumferential direction of the upper cover (61).

The upper cover (61) and the body portion (53) are coupled to each other by a plurality of fastening members, such as bolts. The fastening members are each inserted into a corresponding one of the plurality of cover-side fastening holes (83) and a corresponding one of the plurality of body-portion-side fastening holes (84).

The inner cylinder (62) has a cylindrical shape that opens upward and downward. The inner cylinder (62) is provided at a central portion of the upper cover (61). The inner cylinder (62) projects downward from the upper cover (61). The inner cylinder (62) is at a height position corresponding to an upper portion of the outer cylinder (52). In other words, the inner cylinder (62) is at a height position corresponding to substantially half of the upper side of the outer cylinder (52). A cylinder space (63) is formed between the outer cylinder (52) and the inner cylinder (62). The cylinder space (63) constitutes a portion of the separation space (51). In the cylinder space (63), in particular, a swirling flow of the refrigerant is easily formed.

An outflow passage (64) that causes the separation space (51) and a discharge pipe (not illustrated) to be in communication with each other is formed in the inside of the inner cylinder (62). The discharge pipe is connected to the refrigerant circuit.

The axes of the upper cover (61), the inner cylinder (62), and the outer cylinder (52) substantially coincide with each other. In FIG. 3, these axes are indicated by a one dot chain line L.

Outline of Bent Pipe

The bent pipe (70) will be described with reference to FIG. 2 to FIG. 6.

The bent pipe (70) introduces the high-pressure refrigerant containing the oil into the oil separator body (50). The bent pipe (70) is disposed to surround the body portion (53) of the oil separator body (50) in the circumferential direction. The height position of the bent pipe (70) is the same throughout the entirety thereof. In other words, the bent pipe

Figure 5:
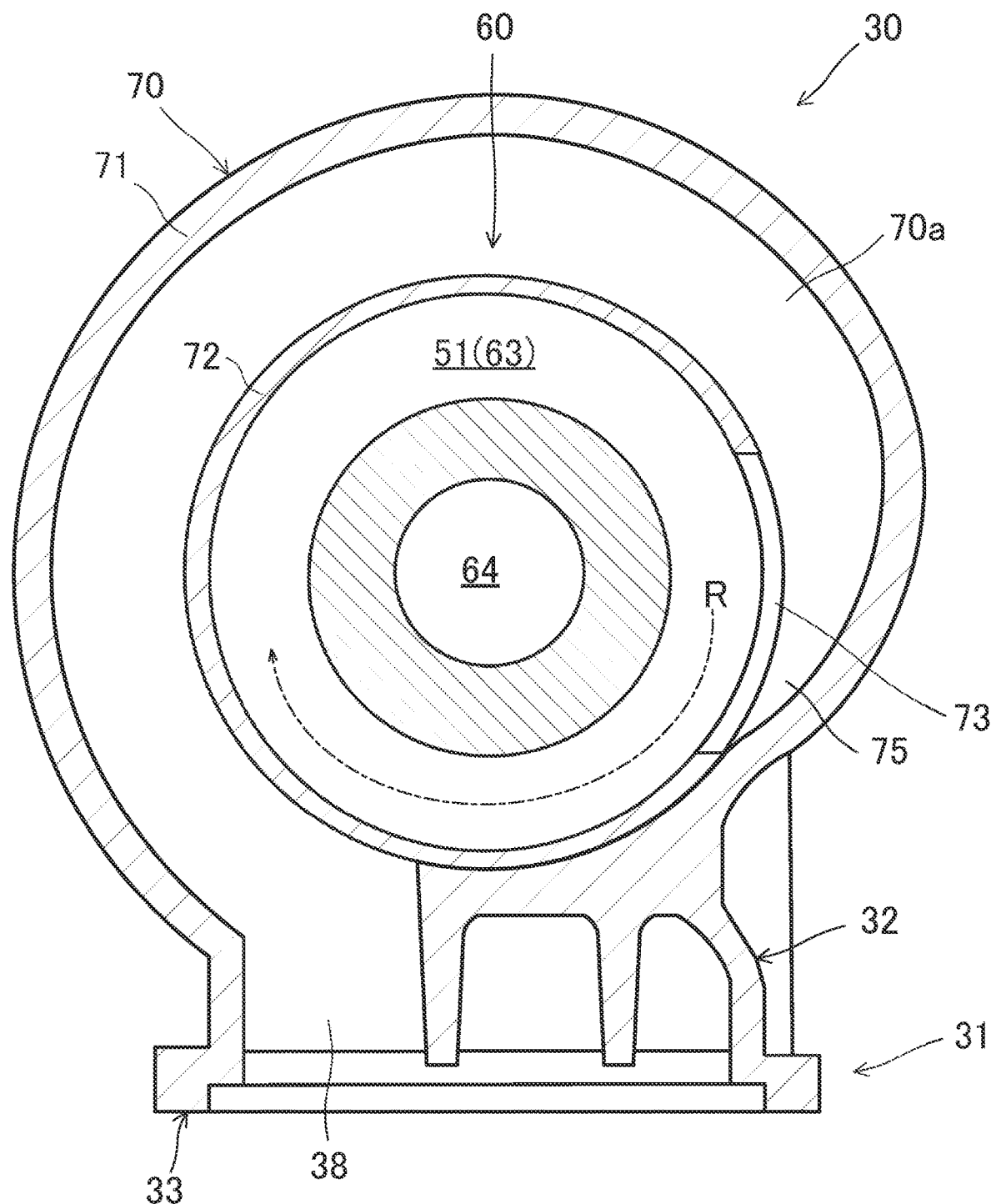
FIG. 5 is a sectional view taken along line V-V in FIG. 3.

(70) in the present embodiment is not inclined in the vertical direction. The bent pipe (70) curves in a direction along the swirling flow. In FIG. 5, the direction of the swirling flow is indicated by the arrow R of a one dot chain line. The bent pipe (70) is at a height position corresponding to the cylinder space (63). In the inside of the bent pipe (70), an internal flow path (70a) that curves along the bent pipe (70) is formed. As illustrated in FIG. 5, the inflow end of the internal flow path (70a) of the bent pipe (70) is in communication with the discharge flow path (38) of the flange portion (33). The outflow end of the internal flow path (70a) of the bent pipe (70) is in communication with the outflow port (73) formed in the inner wall portion (72). The outflow port (73) causes the internal flow path (70a) and the separation space (51) to be in communication with each other.

Operational Action of Compressor

The operational action of the compressor (10) will be described with reference to FIG. 1.

When the electric motor (15) drives the drive shaft (18), the screw rotor (22) rotates. In response to the rotation of the screw rotor (22), the gate rotor (23) rotates. As a result, a suction process, a compression process, and a discharge process are sequentially and repeatedly performed in the compression mechanism (20).

1) Suction Process

In the compression mechanism (20), the volumes of the screw grooves (24) in communication with the low-pressure chamber (L) are increased. In response to this, the low-pressure gas in the low-pressure chamber (L) is sucked into the screw grooves (24) through the suction port.

2) Compression Process

When the screw rotor (22) further rotates, the gate rotor (23) divides the screw grooves (24), thereby forming a compression chamber in the screw grooves (24). As a result of the volume of the compression chamber decreasing in response to the rotation of the gate rotor (23), the refrigerant in the compression chamber is compressed.

3) Discharge Process

When the screw rotor (22) further rotates, the compression chamber is caused to be in communication with the discharge port. The refrigerant in the compression chamber is discharged to the high-pressure chamber (H) through the discharge port.

As a result of the above-described three processes being performed successively and repeatedly, the refrigerant is discharged periodically from the compression mechanism (20) to the high-pressure chamber (H).

Operation of Oil Separator

Operation of the oil separator will be described with reference to FIG. 3 and FIG. 5.

The refrigerant discharged into the high-pressure chamber (H) is sent to a high-pressure space (S) in the flange portion (33) and flows into the bent pipe (70) through the discharge flow path (38). The bent pipe (70) curves to surround the body portion (53) in the circumferential direction. Therefore, a centrifugal force acts on the oil contained in the refrigerant that flows in the internal flow path (70a). As a result, the oil is separated from the refrigerant. The oil that has been separated from the refrigerant moves onto the inner surface of the outer wall portion (71). The separated fine oil particles aggregate on the inner surface of the outer wall portion (71).

The bent pipe (70) is positioned on the radially outer side of the outer cylinder (52). Therefore, the centrifugal force that acts on the oil in the internal flow path (70a) of the bent pipe (70) is larger than that in the separation space (51). Consequently, the bent pipe (70) can accelerate the oil separation effect.

The refrigerant and the oil that have flowed out from the bent pipe (70) flow into the separation space (51) in the outer cylinder (52) through the outflow port (73). The oil aggregated in the bent pipe (70) accumulates at the bottom of the separation space (51). The fine oil particles that remain in the refrigerant are separated from the refrigerant by the centrifugal force in the separation space (51).

The refrigerant from which the oil has been separated as described above flows out to the discharge pipe via the outflow passage (64) of the inner cylinder (62). The refrigerant that has flowed out from the discharge pipe flows in the refrigerant circuit and is utilized for a refrigeration cycle.

Details of Bent Pipe and Peripheral Structure Thereof

Details of the bent pipe (70) and the peripheral structure thereof will be described with reference to FIG. 2 to FIG. 6.

The bent pipe (70) includes the outer wall portion (71) and the inner wall portion (72). The oil separator body (50) has a recessed portion (74), a seal member (65), and a positioning mechanism (80).

Outer Wall Portion

The outer wall portion (71) extends in the circumferential direction of the body portion (53). The outer wall portion (71) expands from the body portion (53) outwardly in the radial direction of the body portion (53). The inner surface of the outer wall portion (71) facing the internal flow path (70a) has a substantially U-shape that is open on the front side when viewed in an A section. Here, the A section is a section perpendicular to the pipe axis direction of the bent pipe (70). In other words, the A section is a section perpendicular to the paper surface direction of FIG. 2.

Figure 6:
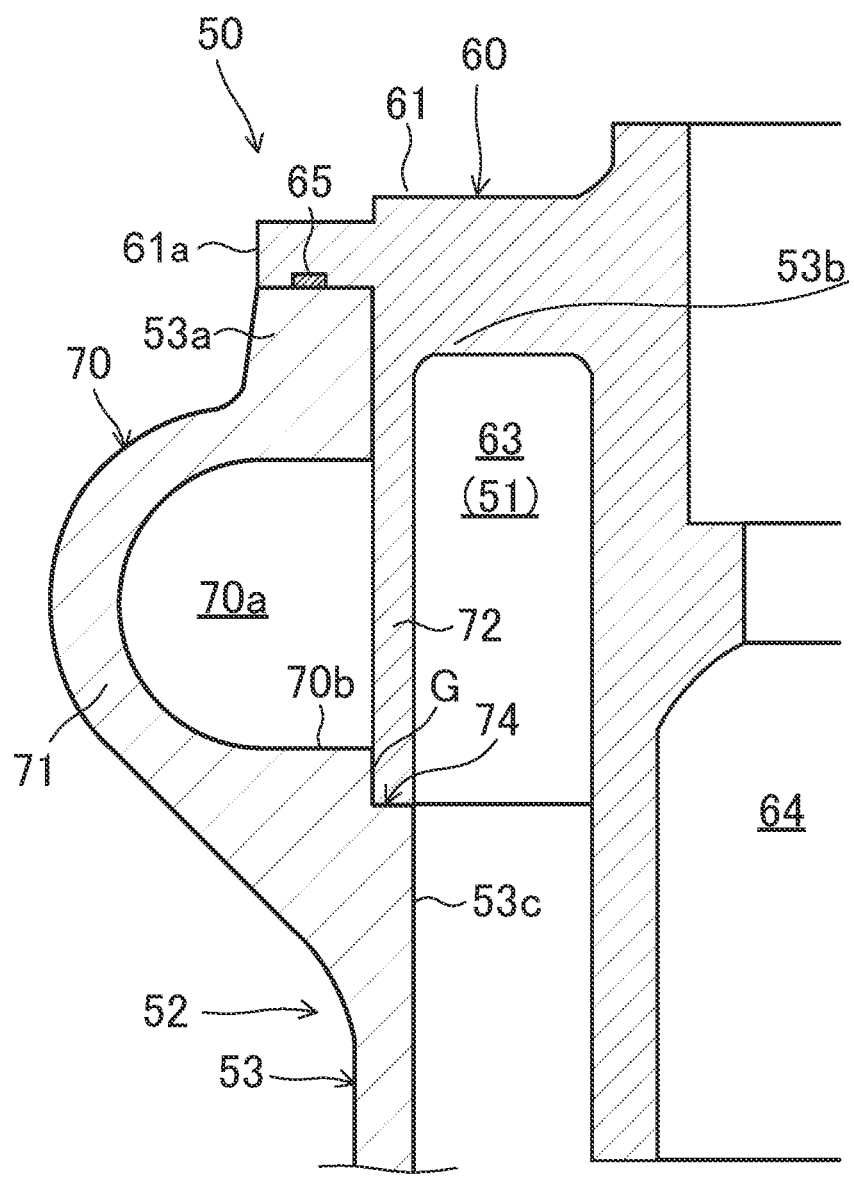
FIG. 6 is an enlarged view of a main portion in FIG. 4.

As illustrated in FIG. 6, the outer wall portion (71) and the body portion (53) are integral with each other. The outer wall portion (71) is formed to be integral with an upper portion of the body portion (53). In a state in which the cover member (60) is not attached to the outer cylinder (52), the inner surface of the outer wall portion (71) faces the inside of the outer cylinder (52).

Inner Wall Portion

The inner wall portion (72) extends along the outer wall portion (71) in the circumferential direction of the body portion (53). The inner wall portion (72) blocks a radially inner-side open part of the outer wall portion (71). The inner surface of the inner wall portion (72) facing the internal flow path (70a) has a planar shape extending vertically in the A sectional view.

The outer wall portion (71) and the inner wall portion (72) are constituted by different members. The inner wall portion (72) and the upper cover (61) are integral with each other. In more detail, the inner wall portion (72), the upper cover (61), and the inner cylinder (62) are integral with each other. The inner wall portion (72) extends downward from a part close to the outer edge of the upper cover (61).

As illustrated in FIG. 5, the inner wall portion (72) has the outflow port (73). The outflow port (73) is at a position corresponding to the outflow end of the bent pipe (70). The outflow port (73) corresponds to the hole in the present disclosure. The outflow port (73) has an oval shape or an elliptic shape extending in the circumferential direction of the bent pipe (70).

Recessed Portion

As illustrated in FIG. 2 and FIG. 6, in a continuous portion between a lower portion of the outer wall portion (71) and the body portion (53), a part on the inner side of the oil separator body (50) includes the recessed portion (74). Specifically, the recessed portion (74) is formed at a continuous portion between a lower surface (70b) of the internal flow path (70a) of the bent pipe (70) and an inner peripheral surface (53c) of the body portion (53).

The recessed portion (74) has an opening face on the upper side. The recessed portion (74) further has an opening face on the inner peripheral side. The recessed portion (74) extends along the body portion (53) in the circumferential direction. The recessed portion (74) has an annular shape in top view. The recessed portion (74) has a stepped shape that does not have an inner peripheral surface on the inner side. In the recessed portion (74), an annular step surface extending downward from the lower surface (710) of the internal flow path (70a) is formed. In a state in which the cover member (60) is attached to the outer cylinder (52), a lower portion of the inner wall portion (72) is fitted into the recessed portion (74). In this state, the step surface of the recessed portion (74) and the outer peripheral surface at the lower end of the inner wall portion (72) are in contact with each other. In addition, the bottom surface of the recessed portion (74) and the lower surface of the inner wall portion (72) are in contact with each other. Consequently, it is possible to increase the contact area (or a seal area) of the gap (G) between the outer wall portion (71) and the inner wall portion (72).

Seal Member

As illustrated in FIG. 6, the seal member (65) is provided between the lower surface of the outer peripheral portion of the upper cover (61) and the upper surface of the peripheral portion (53a) of the body portion (53). The seal member (65) is formed over the entire periphery of the upper end surface of the peripheral portion (53a). The seal member (65) is constituted by, for example, an annular packing or an O-ring. The seal member (65) suppresses the fluid in the internal flow path (70a) of the bent pipe (70) from flowing out to the outside of the oil separator body (50) through a gap between the body portion (53) and the upper cover (61).

Positioning Mechanism

Figure 4:
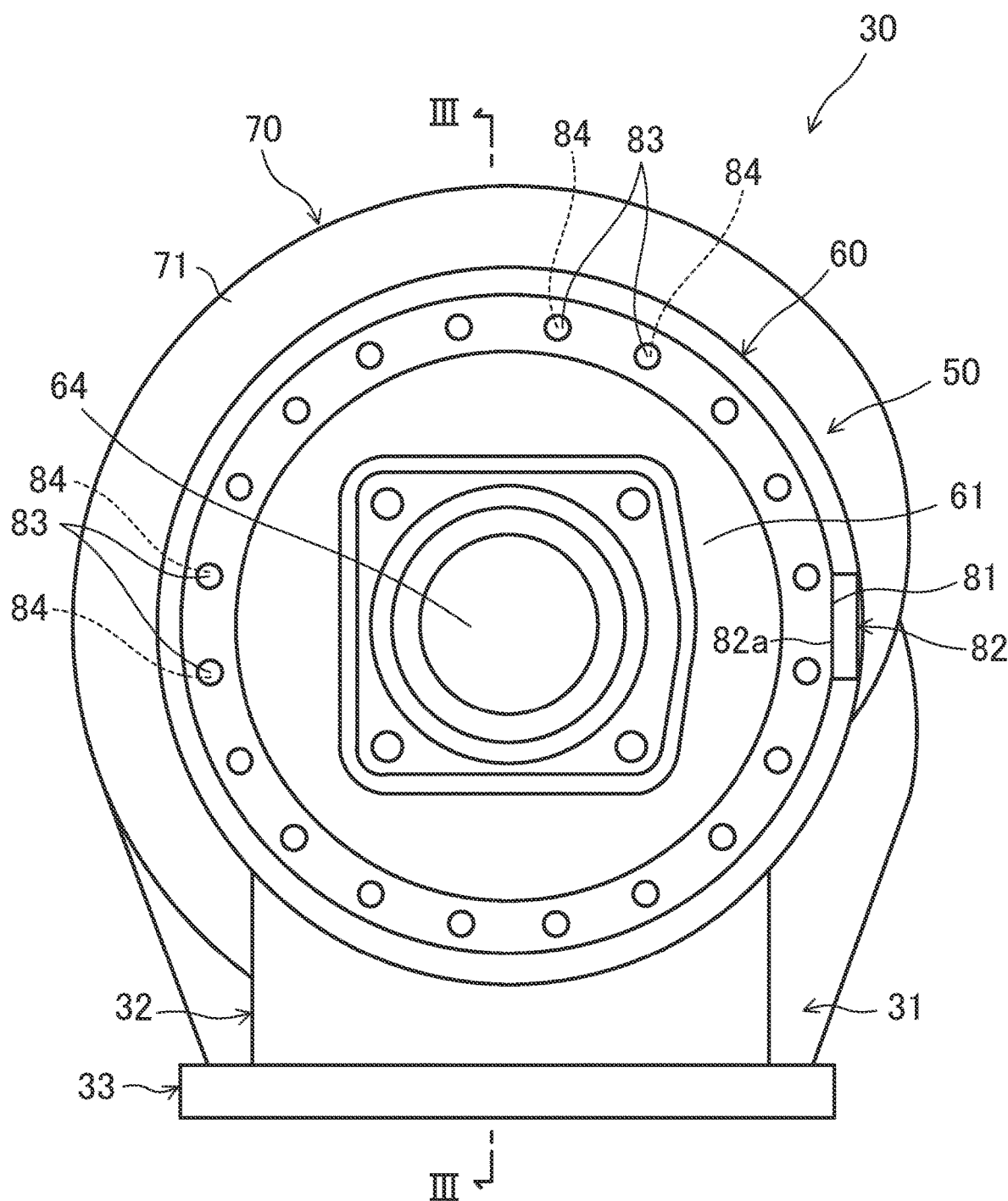
FIG. 4 is a top view of an oil separator according to an embodiment.

As illustrated in FIG. 2 and FIG. 4, the oil separator body (50) has the positioning mechanism (80). The positioning mechanism (80) determines relative positions of the outer wall portion (71) and the inner wall portion (72) in the circumferential direction. Specifically, as illustrated in FIG. 5, the positioning mechanism (80) determines the relative positions of the inner wall portion (72) and the outer wall portion (71) such that the outflow port (73) of the inner wall portion (72) is at a position corresponding to a terminal end (75) of the bent pipe (70).

As illustrated in FIG. 2 and FIG. 4, the positioning mechanism (80) includes a first planar portion (81) and a projecting portion (82). The first planar portion (81) is formed at the outer peripheral surface of the upper cover (61). The projecting portion (82) is formed at the body portion (53).

The first planar portion (81) is a part obtained by cutting out the outer peripheral surface of the upper cover (61) into a flat shape. The first planar portion (81) is formed at, of the outer peripheral surface of the upper cover (61), a part at the right end. The first planar portion (81) is positioned above the outflow port (73). The first planar portion (81) and the outflow port (73) overlap each other in the axial direction of the upper cover (61). In other words, the first planar portion (81) and the outflow port (73) are equal in angular position to each other in the circumferential direction in the cover member (60).

The projecting portion (82) is disposed at the outer edge of the open portion (53b) of the body portion (53). The projecting portion (82) is positioned above the terminal end (75) (refer to FIG. 5) of the bent pipe (70). The projecting portion (82) and the terminal end (75) overlap each other in the axial direction of the body portion (53). In other words, the angular positions of the projecting portion (82) and the terminal end (75) in the circumferential direction are equal to each other in the body portion (53).

The projecting portion (82) has a rectangular parallelepiped shape. The projecting portion (82) extends in a tangential direction of the peripheral portion (53a). A second planar portion (82a) is formed at a surface of the projecting portion (82) facing the side of an axis R. In a state in which the cover member (60) is attached to the body portion (53) at a correct angular position, the second planar portion (82a) is at a position facing the first planar portion (81). When the cover member (60) is attached to the body portion (53) at an incorrect angular position, the outer peripheral surface of the upper cover (61) and the projecting portion (82) interfere with each other.

The positioning mechanism (80) can suppress the outflow port (73) and the terminal end (75) of the bent pipe (70) from deviating from each other in the circumferential direction of the body portion (53). This issue will be described in detail below.

Figure 7:
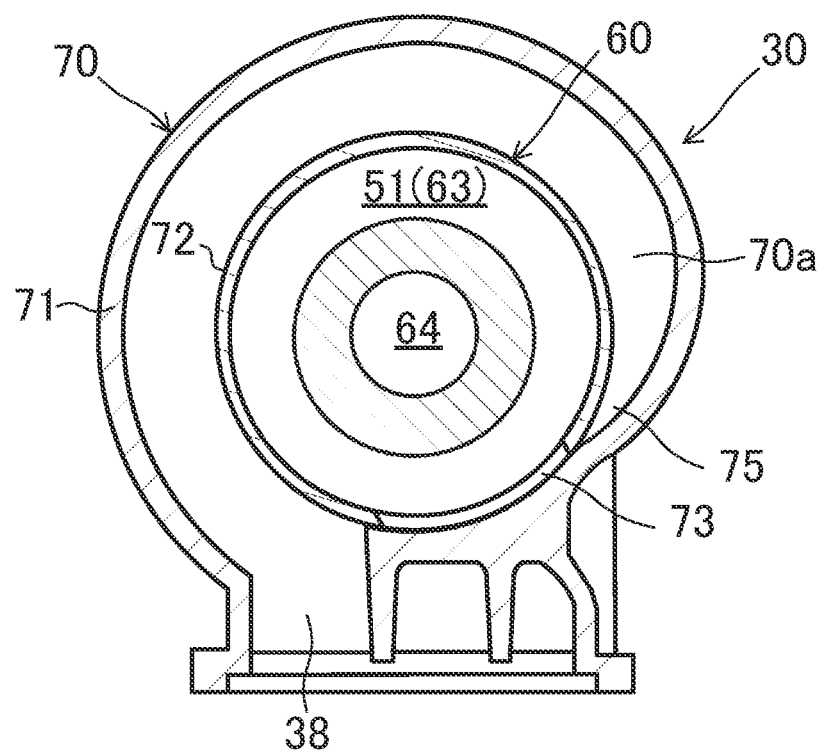
FIG. 7 is a view corresponding to FIG. 5 and illustrating a state in which an outflow port of an inner wall portion is displaced to the downstream side of an internal flow path.

If an operator attaches the cover member (60) to the outer cylinder (52) at an incorrect angular position as illustrated in FIG. 7, the outflow port (73) may be displaced toward the downstream side of the internal flow path (70a) from the terminal end (75) of the bent pipe (70). In this case, the internal flow path (70a) of the bent pipe (70) and the separation space (51) are isolated from each other by the inner wall portion (72). Therefore, it is not possible to introduce the refrigerant from the bent pipe (70) into the separation space (51).

Figure 8:
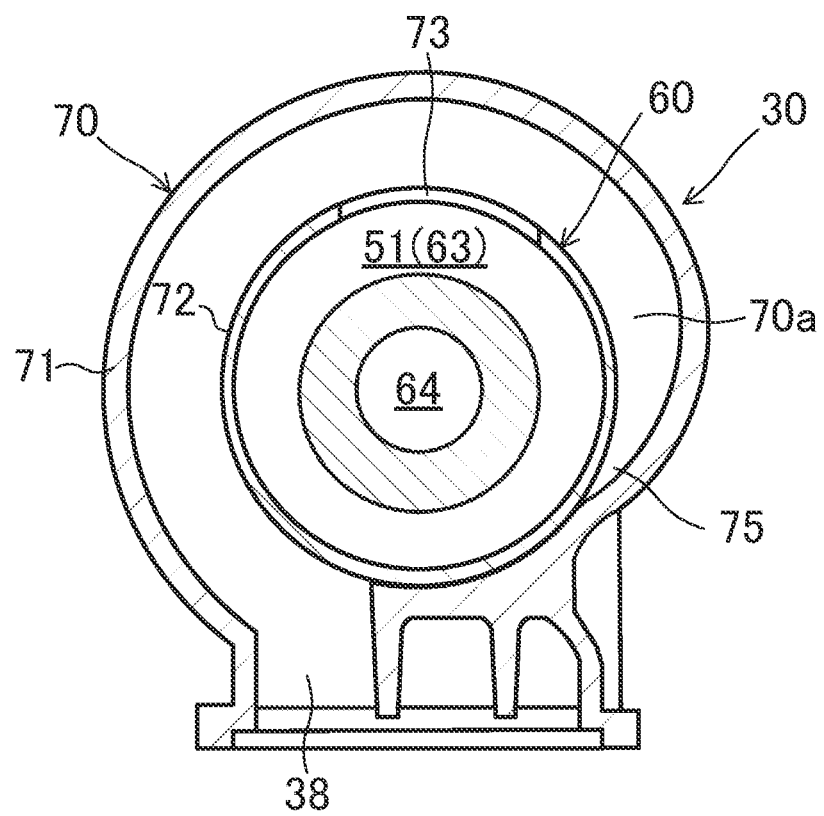
FIG. 8 is a view corresponding to FIG. 5 and illustrating a state in which an outflow port of an inner wall portion is displaced to the upstream side of an internal flow path.

If an operator attaches the cover member (60) to the outer cylinder (52) at an incorrect angular position as illustrated in FIG. 8, the outflow port (73) may be displaced toward the upstream side of the internal flow path (70a) from the terminal end (75) of the bent pipe (70). In this case, an intermediate portion of the internal flow path (70a) of the bent pipe (70) is in communication with the separation space (51) through the outflow port (73). Therefore, it is not possible to sufficiently separate the oil in the refrigerant by a centrifugal force in the bent pipe (70).

Thus, when an operator attaches the cover member (60) to the outer cylinder (52) at an incorrect angular position, the function of the oil separator (30) is lost.

In contrast, the cover member (60) according to the present embodiment can be attached to the outer cylinder (52) only at a position at which the first planar portion (81) and the second planar portion (82a) of the projecting portion (82) face each other. In this state, as illustrated in FIG. 5, the outflow port (73) is at a position corresponding to the terminal end (75) of the bent pipe (70). It is thus possible to prevent an operator from attaching the cover member (60) to the outer cylinder (52) at an incorrect angular position and possible to reliably exert the function of the oil separator (30).

Molding of Oil Separator

The oil separator (30) is constituted by; mainly, two components of a first member and a second member. The first member includes the cover (31), the body portion (53), the bottom portion (54), and the outer wall portion (71). The first member is constituted by a cast product molded with a cast. The second member includes the upper cover (61), the inner cylinder (62), and the inner wall portion (72). The second member is constituted by a cast product molded with a cast.

In manufacture of the first member and the second member, the bent pipe (70) is divided into the first member including the outer wall portion (71) and the second member including the inner wall portion (72). Therefore, it is possible to mold the bent pipe (70) without using a member, such as a core, corresponding to the internal flow path (70a) of the bent pipe (70). Therefore, it is possible to easily manufacture the oil separator (30).

Effects of Embodiment

The outer wall portion (71) and the inner wall portion (72) of the bent pipe (70) are constituted by different members. Therefore, it is possible to mold the bent pipe (70) by casting without using a core. Therefore, it is possible to easily manufacture the oil separator (30).

Since the inner wall portion (72) and the upper cover (61) are constituted by an integral member, it is possible to reduce the manufacturing man-hour and the manufacturing costs of the oil separator (30). In addition, it is possible to reduce the number of components of the oil separator (30).

Due to the inner wall portion (72), the upper cover (61), and the inner cylinder (62) being constituted by an integral member, it is possible to further reduce the manufacturing man-hour and the manufacturing costs of the oil separator (30). In addition, it is possible to further reduce the number of components of the oil separator (30).

The oil separator (30) includes the positioning mechanism (80) that determines relative positions of the outer wall portion (71) and the inner wall portion (72) in the circumferential direction. It is thus possible to reliably prevent the outflow port (73) of the bent pipe (70) and the outer wall portion (71) from being displaced from each other, as illustrated in FIG. 7 and FIG. 8. Therefore, it is possible to reliably prevent the function of the oil separator (30) from being impaired, and it is possible to improve the reliability of the oil separator (30).

The positioning mechanism (80) has the first planar portion (81) provided at the upper cover (61) and the projecting portion (82) provided at the body portion (53) and including the second planar portion (82a). Due to the first planar portion (81) and the second planar portion (82a) being positioned to face each other, it is possible to reliably prevent the oil separator (30) from being incorrectly assembled.

Due to the outer wall portion (71) and the body portion (53) being constituted by an integral member, it is possible to reduce the manufacturing man-hour and the manufacturing costs of the oil separator (30). In addition, it is possible to reduce the number of components of the oil separator (30).

The gap (G) between the outer wall portion (71) and the inner wall portion (72) is in communication with the inside of the oil separator body (50). Therefore, even when the refrigerant in the internal flow path (70a) of the bent pipe (70) leaks into the gap (G), it is possible to cause this fluid to flow out to the separation space (51). Since the pressure in the bent pipe (70) and the pressure in the separation space (51) are substantially equal to each other, the amount of the refrigerant and the oil that leak from the gap (G) into the separation space (51) is not large.

In the bent pipe (70), the oil separated by the centrifugal force aggregates on the inner surface of the outer wall portion (71) and forms an oil film. Therefore, the refrigerant that flows in the vicinity of the inner wall portion (72) at which the gap (G) is formed does not contain much oil. The oil separated in the internal flow path (70a) thus does not substantially leak into the separation space (51) through the gap (G). Therefore, it is possible to sufficiently exert the oil separation effect of the bent pipe (70).

The gap (G) between the outer wall portion (71) and the inner wall portion (72) is not in communication with the outside of the oil separator body (50). Therefore, the refrigerant and the oil in the bent pipe (70) do not leak to the outside of the oil separator body (50).

As illustrated in FIG. 6, a lower portion of the inner wall portion (72) is fitted into the recessed portion (74) of a continuous part between the outer wall portion (71) and the body portion (53). This fitting structure can increase the seal area of the gap (G) between the outer wall portion (71) and the inner wall portion (72).

Modifications of Embodiment

Figure 9:
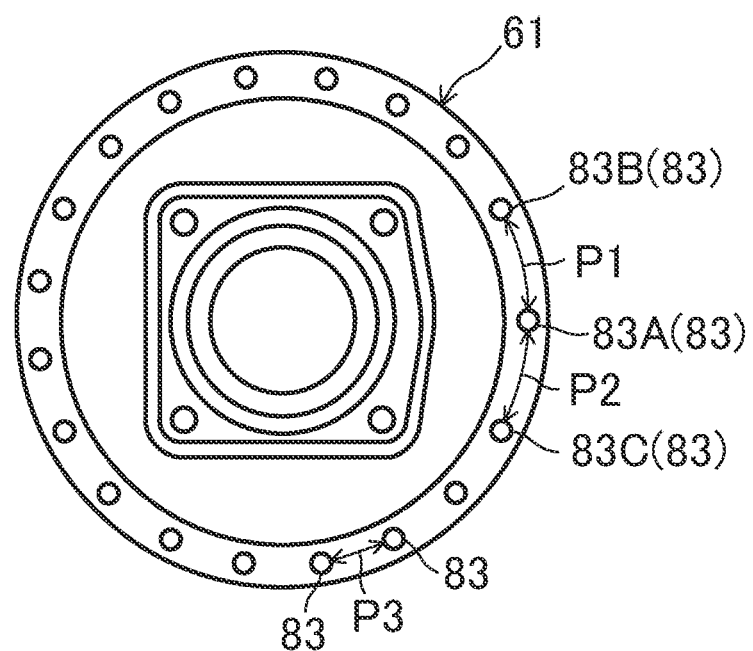
FIG. 9 is a top view of an upper cover according to a modification.
Figure 10:
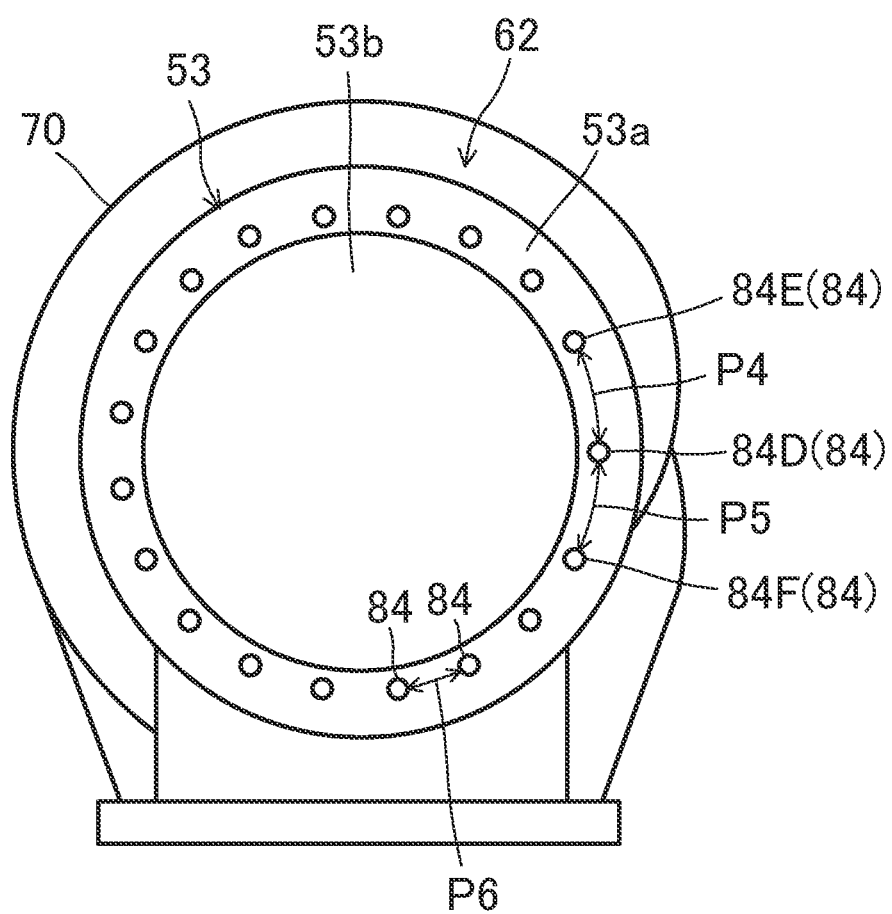
FIG. 10 is a top view of an outer cylinder in a state in which an upper cover according to a modification is detached.

The modifications illustrated in FIG. 9 and FIG. 10 differ from the above-described embodiment in terms of the configuration of the positioning mechanism (80). The positioning mechanism (80) is a structure that causes respective intervals between the fastening holes to be non-uniform. Specifically, the positioning mechanism (80) includes the plurality of cover-side fastening holes (83) and the plurality of body-portion-side fastening holes (84). The cover-side fastening holes (83) correspond to the first fastening holes in the present disclosure. The body-portion-side fastening holes (84) correspond to the second fastening holes of the present disclosure.

As illustrated in FIG. 9, the plurality of cover-side fastening holes (83) are arranged at different intervals at the outer peripheral portion of the upper cover (61) in the circumferential direction. The plurality of cover-side fastening holes (83) include a fastening hole A (83A), a fastening hole B (83B), and a fastening hole C (83C). The fastening hole A (83A) is positioned at the right end of the upper cover (61). The fastening hole A (83A) is disposed between the fastening hole B (83B) and the fastening hole C (83C). An interval between the fastening hole A (83A) and the fastening hole B (83B) in the circumferential direction is referred to as P1, and an interval between the fastening hole A (83A)

and the fastening hole C (83C) in the circumferential direction is referred to as P2. Each interval between the remaining cover-side fastening holes (83) is referred to as P3. In the present example, P1 and P2 are substantially equal to each other. P3 is shorter than P1 and P2. The fastening hole A (83A) is at a position corresponding to the outflow port (73) of the inner wall portion (72).

As illustrated in FIG. 10, the plurality of body-portion-side fastening holes (84) are arranged at different intervals at the peripheral portion (53a) of the body portion (53) in the circumferential direction. Each of the plurality of body-portion-side fastening holes (84) is at a position overlapping a corresponding one of the plurality of cover-side fastening holes (83) in the axial direction of the body portion (53). The plurality of body-portion-side fastening holes (84) include a fastening hole D (84D), a fastening hole E (84E), and a fastening hole F (84F). The fastening hole D (84D) is positioned at the right end of the peripheral portion (53a) of the body portion (53). The fastening hole D (84D) is disposed between the fastening hole E (84E) and the fastening hole F (84F). An interval between the fastening hole D (84D) and the fastening hole E (84E) in the circumferential direction is referred to as P4, and an interval between the fastening hole D (84D) and the fastening hole C (83C) in the circumferential direction is referred to as P5. Each interval between the remaining cover-side fastening holes (83) is referred to as P6. In the present example, P4 and P5 are substantially equal to each other. P6 is shorter than P4 and P5. The fastening hole D (84D) is at a position corresponding to the terminal end (75).

The fastening member are inserted into the plurality of cover-side fastening holes (83) and the plurality of body-portion-side fastening holes (84) to attach the cover member (60) to the body portion (53). In this state, as illustrated in FIG. 5, the outflow port (73) of the inner wall portion (72) is at a position corresponding to the terminal end (75) of the bent pipe (70).

When respective intervals between the plurality of cover-side fastening holes (83) are not uniform and respective intervals between the plurality of body-portion-side fastening holes (84) are not uniform, the cover member (60) is prevented from being attached to the body portion (53) at an incorrect angular position. It is thus possible to reliably prevent the outflow port (73) of the inner wall portion (72) from being displaced in the circumferential direction with respect to the terminal end (75), as illustrated in FIG. 7 and FIG. 8.

The positioning mechanism (80) according to the modification can determine the relative positions of the outer wall portion (71) and the inner wall portion (72) in the circumferential direction without provision of another component or the like.

Other Embodiments

Figure 11:
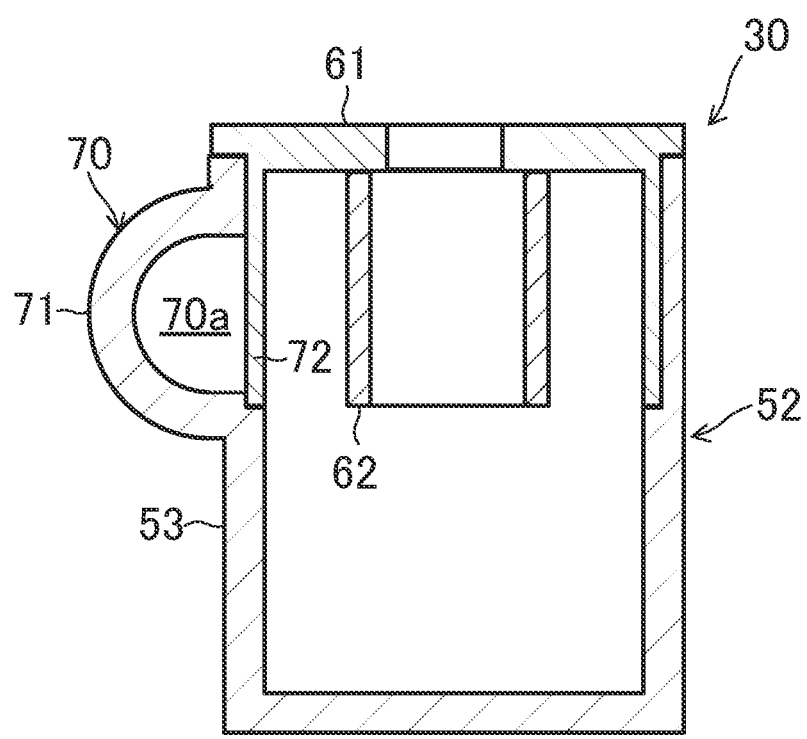
FIG. 11 is a schematic longitudinal sectional view of an oil separator according to another embodiment.

As schematically illustrated in FIG. 11, the inner wall portion (72) and the upper cover (61) may be constituted by an integral member, and the upper cover (61) and the inner cylinder (62) may be constituted by different members.

Figure 12:
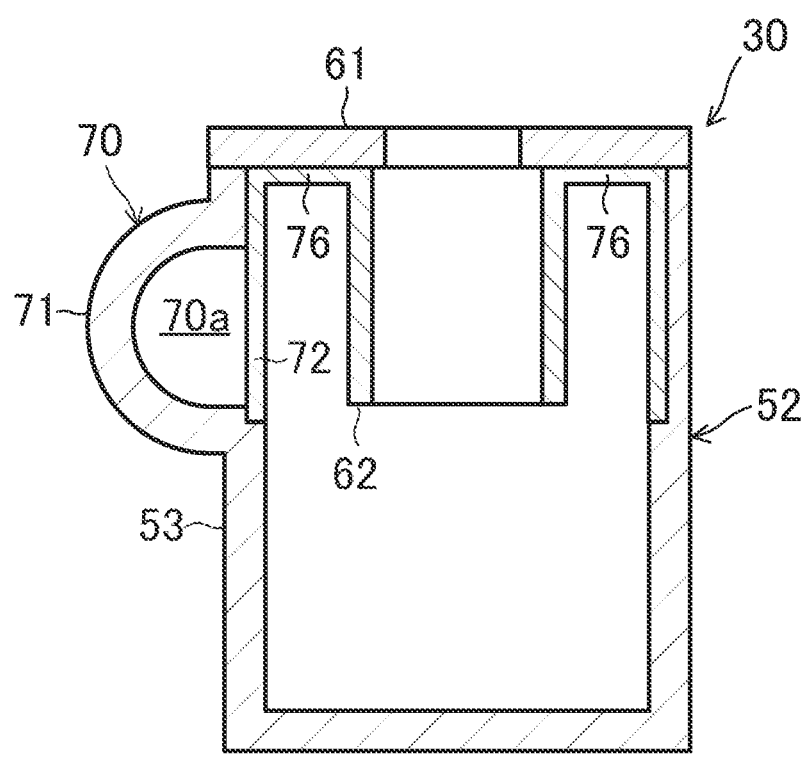
FIG. 12 is a schematic longitudinal sectional view of an oil separator according to another embodiment.

As schematically illustrated in FIG. 12, the inner wall portion (72) and the inner cylinder (62) may be constituted by an integral member, and the upper cover (61) may be constituted by a member that differs from the member constituting the inner wall portion (72) and the inner cylinder (62). In this configuration, the inner wall portion (72) and the inner cylinder (62) are integrally coupled to each other via, for example, one or a plurality of coupling portions (76).

The outer wall portion (71) and the upper cover (61) may be constituted by an integral member, and the inner wall portion (72) and the body portion (53) may be constituted by an integral member.

The recessed portion (74) of the present embodiment has a stepped shape. The recessed portion (74), however, may be a groove extending along the body portion (53) in the circumferential direction. The groove has an annular shape in top view.

The height position of the bent pipe (70) may gradually change from the inflow port (the discharge flow path (38)) to the outflow port (73).

The compressor (10) may be a twin-screw compressor having two screw rotors. The compressor (10) may be a two-gate single screw compressor having one screw rotor and two gate rotors.

Other than the screw type, the compressor (10) may be of a rotary type, a swing type, a scroll type, a turbo type, or the like.

The refrigeration apparatus may be an air conditioning apparatus that performs indoor air-conditioning, a cooler that cools inside air, a heat-pump water heater, or the like.

The present disclosure is useful for a centrifugal separation-type oil separator.

The invention claimed is:

1. A centrifugal separation-type oil separator comprising:
an oil separator body having a cylindrical body portion; and
a bent pipe provided on an outer peripheral side of the body portion to surround the body portion in a circumferential direction, the bent pipe being configured to introduce a fluid containing an oil into an inside of the oil separator body, the bent pipe including
an outer wall portion extending in the circumferential direction of the body portion and expanding radially outward from the body portion, and
an inner wall portion extending along the outer wall portion and blocking a radially inner-side open part of the outer wall portion,
the outer wall portion and the inner wall portion being formed by different members,
an upper side of the body portion being open,
the oil separator body having an upper cover blocking an upper-side open portion of the body portion,
the inner wall portion and the upper cover being formed by an integral member,
the upper cover and the body portion being formed by different members, and
an outer peripheral portion of the upper cover being disposed on an upper side of a peripheral portion of the body portion to block the open portion.

2. The centrifugal separation-type oil separator according to claim 1, wherein
the oil separator body has an inner cylinder disposed in an inside of the body portion, and
the inner wall portion, the upper cover, and the inner cylinder are formed by an integral member.

3. The centrifugal separation-type oil separator according to claim 1, wherein
the oil separator body has an inner cylinder disposed in an inside of the body portion, and
the inner wall portion and the inner cylinder are formed by an integral member.

4. The centrifugal separation-type oil separator according to claim 1, further comprising:
a positioning mechanism configured to determine relative positions of the outer wall portion and the inner wall portion in the circumferential direction,
the inner wall portion having a hole forming an outflow port of the bent pipe.

5. The centrifugal separation-type oil separator according to claim 1, wherein
the outer wall portion and the body portion are formed by an integral member.

6. The centrifugal separation-type oil separator according to claim 5, wherein
in a continuous portion between the outer wall portion and the body portion, a part facing the inside of the oil separator body has a recessed portion,
the recessed portion has an open face on an upper side and extends along the body portion in the circumferential direction, and
a lower portion of the inner wall portion is fitted into the recessed portion.

7. The centrifugal separation-type oil separator according to claim 1, wherein
a gap between the outer wall portion and the inner wall portion is in communication with the inside of the oil separator body.

* * * * *